(12) United States Patent
Lai

(10) Patent No.: US 8,941,598 B2
(45) Date of Patent: Jan. 27, 2015

(54) TOUCH CONTROLLER FOR TOUCH-SENSING DISPLAY APPARATUS AND DRIVING METHOD THEREOF

(75) Inventor: Chih-Chang Lai, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 416 days.

(21) Appl. No.: 12/986,185

(22) Filed: Jan. 7, 2011

(65) Prior Publication Data
US 2012/0113045 A1 May 10, 2012

(30) Foreign Application Priority Data

Nov. 5, 2010 (TW) ............................... 99138165 A

(51) Int. Cl.
G06F 3/041 (2006.01)
G09G 3/20 (2006.01)
G09G 3/36 (2006.01)

(52) U.S. Cl.
CPC ............... *G06F 3/0416* (2013.01); *G09G 3/20* (2013.01); *G09G 3/3655* (2013.01); *G09G 2300/08* (2013.01); *G09G 2310/08* (2013.01); *G09G 2330/06* (2013.01)
USPC ........................................................ 345/173

(58) Field of Classification Search
None
See application file for complete search history.

(56) References Cited

U.S. PATENT DOCUMENTS

| 4,621,257 | A | * | 11/1986 | Brown | 341/5 |
|---|---|---|---|---|---|
| 5,631,666 | A | * | 5/1997 | Tagawa et al. | 345/104 |
| 5,923,320 | A | * | 7/1999 | Murakami et al. | 345/179 |
| 6,215,477 | B1 | * | 4/2001 | Morrison et al. | 345/173 |
| 6,239,788 | B1 | * | 5/2001 | Nohno et al. | 345/173 |
| 8,542,215 | B2 | * | 9/2013 | Hanauer et al. | 345/174 |
| 2004/0263506 | A1 | * | 12/2004 | Koyama et al. | 345/204 |
| 2006/0007181 | A1 | * | 1/2006 | Jung et al. | 345/173 |
| 2006/0077186 | A1 | * | 4/2006 | Park et al. | 345/173 |
| 2006/0256093 | A1 | * | 11/2006 | Furukawa et al. | 345/173 |
| 2007/0171209 | A1 | * | 7/2007 | Lin et al. | 345/173 |
| 2008/0018613 | A1 | * | 1/2008 | Kim et al. | 345/173 |
| 2008/0162997 | A1 | * | 7/2008 | Vu et al. | 714/27 |

(Continued)

FOREIGN PATENT DOCUMENTS

| CN | 1700161 | 11/2005 |
|---|---|---|
| CN | 1963736 | 5/2007 |

(Continued)

OTHER PUBLICATIONS

"First Office Action of China Counterpart Application", issued on Feb. 7, 2014, p. 1-p. 5.

*Primary Examiner* — Antonio Xavier
(74) *Attorney, Agent, or Firm* — Jianq Chyun IP Office

(57) ABSTRACT

A driving method adapted to a touch-sensing display apparatus is provided. The touch-sensing display apparatus includes a display panel and a touch panel. The driving method includes following steps. I scan signals are sequentially sent to drive the display panel to receive a plurality of data signals. M driving signals are sequentially sent to drive the touch panel to generate a plurality of sensing signals during a sensing period. The $m^{th}$ driving signal is synchronized with the $i^{th}$ scan signal, wherein $1 \leq i \leq I$ and $1 \leq m \leq M$. The touch panel is delayed by a predetermined time period within each pulse width of the M driving signals for generating the sensing signals. Furthermore, a touch controller is also provided.

5 Claims, 6 Drawing Sheets

(56) References Cited

U.S. PATENT DOCUMENTS

| | | | |
|---|---|---|---|
| 2008/0309627 A1* | 12/2008 | Hotelling et al. | 345/173 |
| 2008/0309633 A1* | 12/2008 | Hotelling et al. | 345/173 |
| 2009/0251434 A1* | 10/2009 | Rimon et al. | 345/173 |
| 2010/0039396 A1* | 2/2010 | Ho et al. | 345/173 |
| 2010/0079407 A1* | 4/2010 | Suggs | 345/175 |
| 2010/0194697 A1* | 8/2010 | Hotelling et al. | 345/173 |
| 2011/0025635 A1* | 2/2011 | Lee | 345/173 |
| 2011/0115729 A1* | 5/2011 | Kremin et al. | 345/173 |
| 2011/0157064 A1* | 6/2011 | Imai | 345/173 |
| 2011/0181523 A1* | 7/2011 | Grothe et al. | 345/173 |

FOREIGN PATENT DOCUMENTS

| | | |
|---|---|---|
| CN | 101281725 | 10/2008 |
| CN | 101814273 | 8/2010 |

* cited by examiner

TOUCH CONTROLLER FOR TOUCH-SENSING DISPLAY APPARATUS AND DRIVING METHOD THEREOF

CROSS-REFERENCE TO RELATED APPLICATION

This application claims the priority benefit of Taiwan application serial no. 99138165, filed on Nov. 5, 2010. The entirety of the above-mentioned patent application is hereby incorporated by reference herein and made a part of this specification.

BACKGROUND

1. Field of the Invention

The invention relates to a controller of a touch-sensing display apparatus and a driving method of the touch-sensing display apparatus. Particularly, the invention relates to a touch controller of a touch display apparatus and a driving method thereof.

2. Description of Related Art

A display apparatus having a touch-sensing function is generally implemented by a touch system and a display system independent to each other. System integration and cost reduction are unchanged developing trends of electronics industry. With progress of fabrication techniques, a touch panels is now successfully integrated with a display panel, so that a user can direct an electronic device to perform required operations through touch operations. Generally, sensing units on the touch panel and pixel units on the display panel are all arranged on a two-dimensional plane in matrices, and timings for updating frames and detecting touch points are determined according scan signals.

Generally, the touch panel has to detect an electrical difference between a touch operation and a non-touch situation. The electrical difference is generally very small, so that noise interference has to be prevented. However, when the display panel is driven, scan signals, data signals and a common electrode signal are transmitted, and when these signals are varied, the touch panel is influenced. Under a developing trend that the touch panel is integrated with the display panel, interference there between becomes more serious.

SUMMARY OF THE INVENTION

The invention is directed to a touch controller of a touch-sensing display apparatus and a driving method thereof, by which interference between a touch panel and a display panel can be avoided.

The invention provides a driving method adapted to a touch-sensing display apparatus. The touch-sensing display apparatus includes a display panel and a touch panel. The driving method includes following steps. I scan signals are sequentially sent to drive the display panel to receive a plurality of data signals. M driving signals are sequentially sent to drive the touch panel to generate a plurality of sensing signals during a sensing period. An $m^{th}$ driving signal is synchronized with an $i^{th}$ scan signal, where $1 \leq i \leq I$ and $1 \leq m \leq M$. The touch panel is delayed by a predetermined time period within each pulse width of the M driving signals for generating the sensing signals.

In an embodiment of the invention, the predetermined time period is less than a pulse width of the scan signals, and is greater than a toggle time of the data signals.

In an embodiment of the invention, in the step of synchronizing the $m^{th}$ driving signal with the $i^{th}$ scan signal, m=1 and i=I.

In an embodiment of the invention, the predetermined time period is greater than a sum of a pulse width of the scan signals and a toggle time of the data signals, and is less than the pulse width of the driving signals.

In an embodiment of the invention, in the step of synchronizing the $m^{th}$ driving signal with the $i^{th}$ scan signal, a rising edge of the $m^{th}$ driving signal is synchronized with a rising edge of the $i^{th}$ scan signal.

The invention provides a touch controller adapted to a touch-sensing display apparatus. The touch-sensing display apparatus includes a display panel and a touch panel. The touch controller includes a driving unit. The driving unit is coupled to the display panel and the touch panel, and sequentially sends I scan signals and sequentially sends M driving signals, synchronizes an $m^{th}$ driving signal with an $i^{th}$ scan signal, and delays the touch panel by a predetermined time period within each pulse width of the M driving signals for generating a plurality of sensing signals during a sensing period, where $1 \leq i \leq I$ and $1 \leq m \leq M$.

In an embodiment of the invention, the I scan signals drive the display panel to receive a plurality of data signals. The predetermined time period is less than a pulse width of the scan signals, and is greater than a toggle time of the data signals.

In an embodiment of the invention, the touch controller synchronizes a rising edge of the $m^{th}$ driving signal with a rising edge of the $i^{th}$ scan signal.

In an embodiment of the invention, m=1, i=I and M<I.

In an embodiment of the invention, the display panel includes a plurality of display scan lines, the touch panel includes a plurality of touch scan lines. The display scan lines and the touch scan lines are arranged along a first direction.

In an embodiment of the invention, the predetermined time period is greater than a sum of a pulse width of the scan signals and the toggle time of the data signals, and is less than the pulse width of the driving signals.

In an embodiment of the invention, the driving unit synchronizes a rising edge of the $m^{th}$ driving signal with a rising edge of the $i^{th}$ scan signal.

In an embodiment of the invention, the sensing period is between a rising edge and a falling edge of an $(i+1)^{th}$ scan signal, where M<I.

In an embodiment of the invention, the display panel includes a plurality of display scan lines, the touch panel includes a plurality of touch scan lines. The display scan lines are arranged along a first direction, and the touch scan lines are arranged along a second direction.

In an embodiment of the invention, the touch panel is a capacitive touch panel.

According to the above descriptions, in the exemplary embodiments of the invention, the driving signals are synchronized with the corresponding scan signals, and under control of the touch controller, the sensing period of the touch panel is not overlapped to the toggle time of the scan signals of the display panel and the toggle time of the data writing operation, so as to avoid the mutual interference between the touch panel and the display panel.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated

DETAILED DESCRIPTION OF DISCLOSED EMBODIMENTS

In the following embodiments, a capacitive touch panel is taken as an example, though those skilled in the art should understand that the capacitive touch panel is not used to limit the invention. Moreover, a touch display apparatus of the invention is not limited to be a liquid crystal display (LCD).

First Embodiment

Figure 1A:
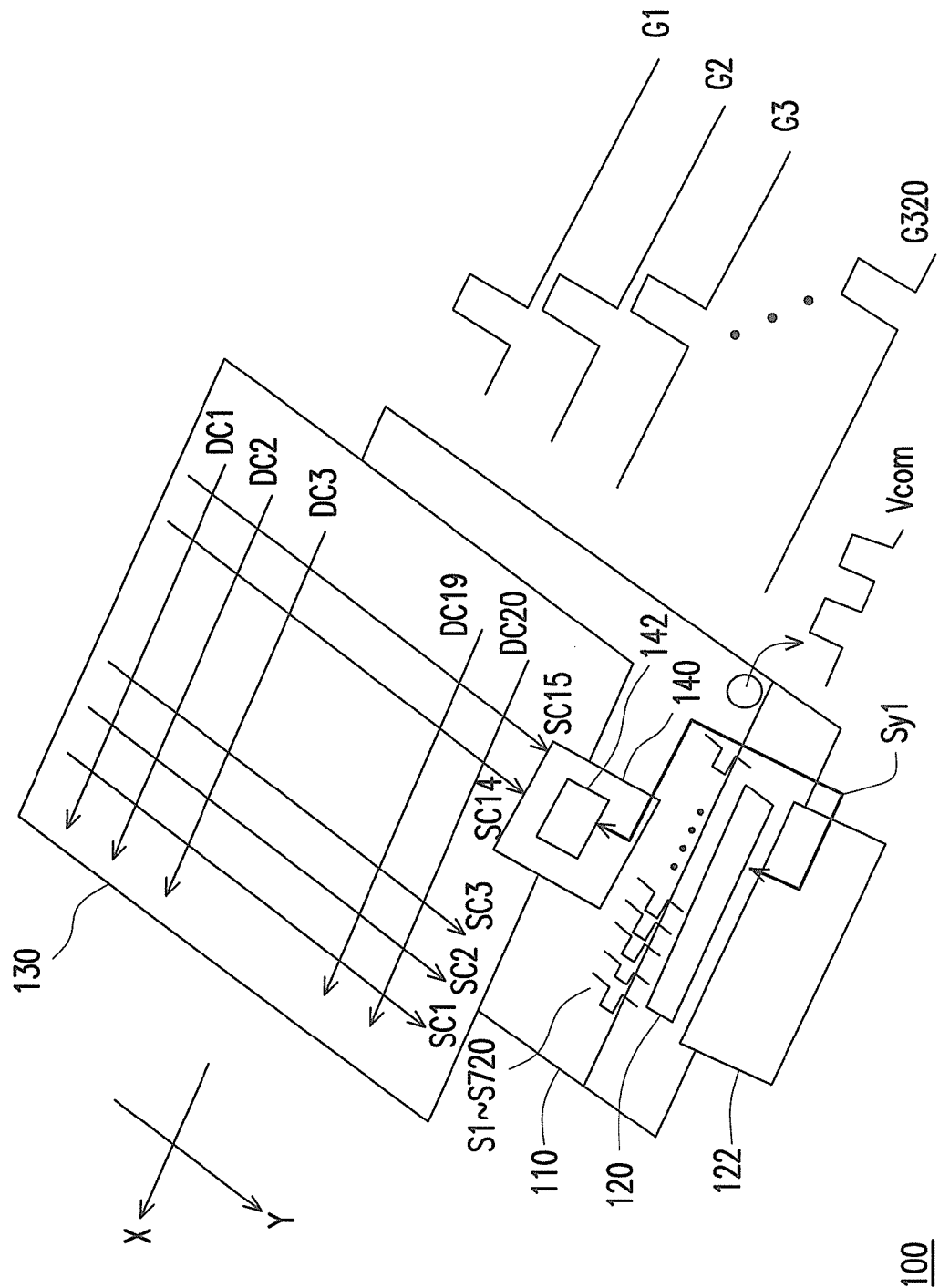
FIG. 1A is a schematic diagram of a touch display apparatus according to the first embodiment of the invention.
Figure 1B:
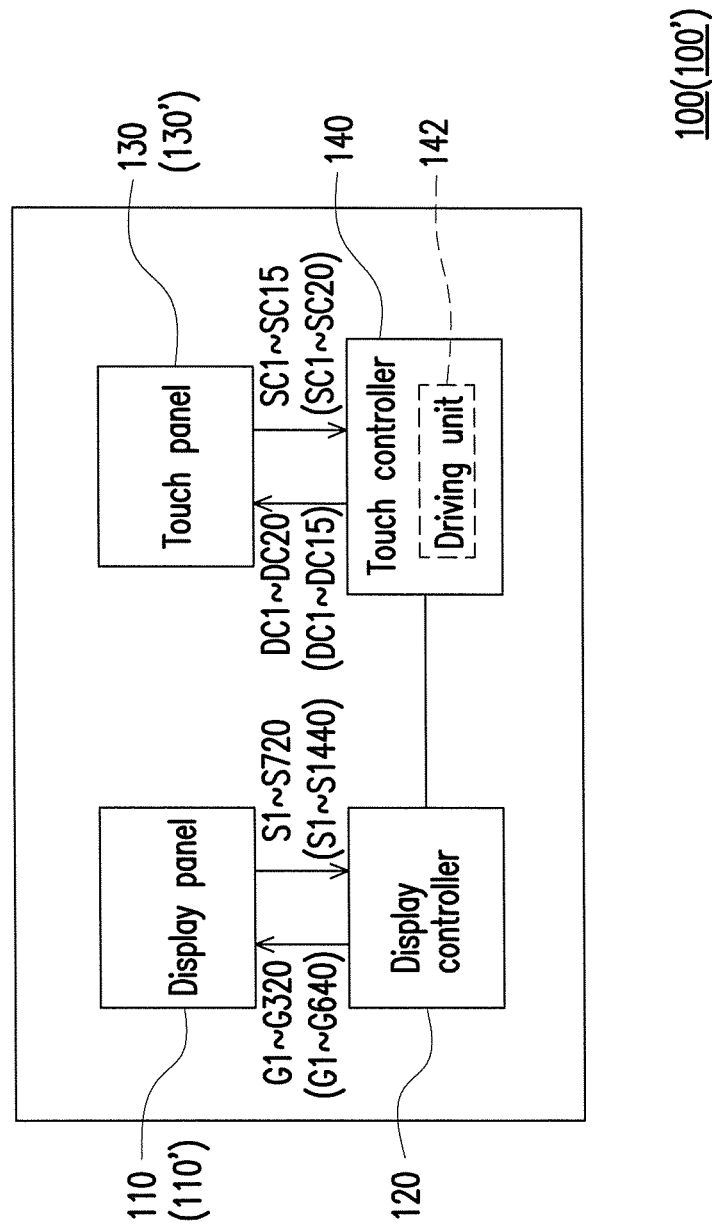
FIG. 1B is a block schematic diagram of a touch display apparatus according to the first embodiment of the invention.

FIG. 1A is a schematic diagram of a touch display apparatus according to the first embodiment of the invention. FIG. 1B is a block schematic diagram of the touch display apparatus according to the first embodiment of the invention.

Referring to FIG. 1A and FIG. 1B, in the present embodiment, the touch display apparatus 100 includes a display panel 110, a display controller 120, a touch panel 130 and a touch controller 140. The touch panel 130 is integrated with the display panel 110 in the same touch display apparatus, and is disposed on the display panel 110, as that shown in FIG. 1A. Moreover, in the present embodiment, the touch controller 140 includes a driving unit 142, which is coupled to the display panel 110 and the touch panel 130 for driving the touch panel 130 to perform touch sensing, as that shown in FIG. 1B.

The display panel 110 includes a plurality of display scan lines and a plurality of data lines. When the display panel 110 is driven, the display scan lines sequentially receive corresponding scan signals G1-G320 for driving pixel units connected to the data lines to sequentially receive data signals S1-S720. It should be noticed that for simplicity's sake, the display scan lines, the data lines and the pixel units are not illustrated on the display panel 110 of FIG. 1. However, according to the scan signals G1-G320 and the data signals S1-S720 illustrated in FIG. 1, it is known that the display scan lines of the display panel 110 are, for example, arranged along a Y-direction, and the data lines are arranged along an X-direction.

The touch panel 130 includes a plurality of touch scan lines and a plurality of sensing lines. When the touch panel 130 is driven, the touch scan lines sequentially receive corresponding driving signals DC1-DC20 for driving sensing units connected to the sensing lines to sequentially generate corresponding sensing signals SC1-SC15 within a sensing period, so as to perform the touch sensing. It should be noticed that for simplicity's sake, the sensing units are not illustrated on the touch panel 130 of FIG. 1. Moreover, according to FIG. 1, it is known that the touch scan lines of the touch panel 130 are, for example, arranged along the Y-direction, and the sensing lines are arranged along the X-direction. In other words, in the present embodiment, the display scan lines of the display panel 110 and the touch scan lines of the touch panel 130 are arranged along the same direction, which are substantially parallel to each other.

It should be noticed that in the present embodiment, the numbers of the display scan lines and the data lines of the display panel 110 and the numbers of the touch scan lines and the sensing lines of the touch panel 130 are only used as an example, and the invention is not limited thereto.

In the present embodiment, the display controller 120 is, for example, disposed on a flexible printed circuit board (PCB) 122, and is coupled to the display panel 110. Similarly, the touch controller 140 is, for example, disposed on another flexible PCB (not shown), and is coupled to the touch panel 130. Moreover, in the present embodiment, the display controller 120 and the touch controller 140 all receive a synchronization signal Sy1 for utilization of synchronization, where the synchronization signal Sy1 may include a frame start signal and a scan line start signal.

When being driven, the display panel 110 at least receives the scan signals G1-G320, the data signals S1-S720 and a common electrode signal Vcom, etc. To avoid interference between the touch panel 130 and the display panel 110, in the present embodiment, the driving signals are synchronized with the corresponding scan signals, and the driving unit 142 of the touch controller 140 delays a sensing time of the touch panel 130 to avoid overlapping a toggle time of the scan signals of the display panel 110 and a toggle time of a data writing operation.

Figure 2:
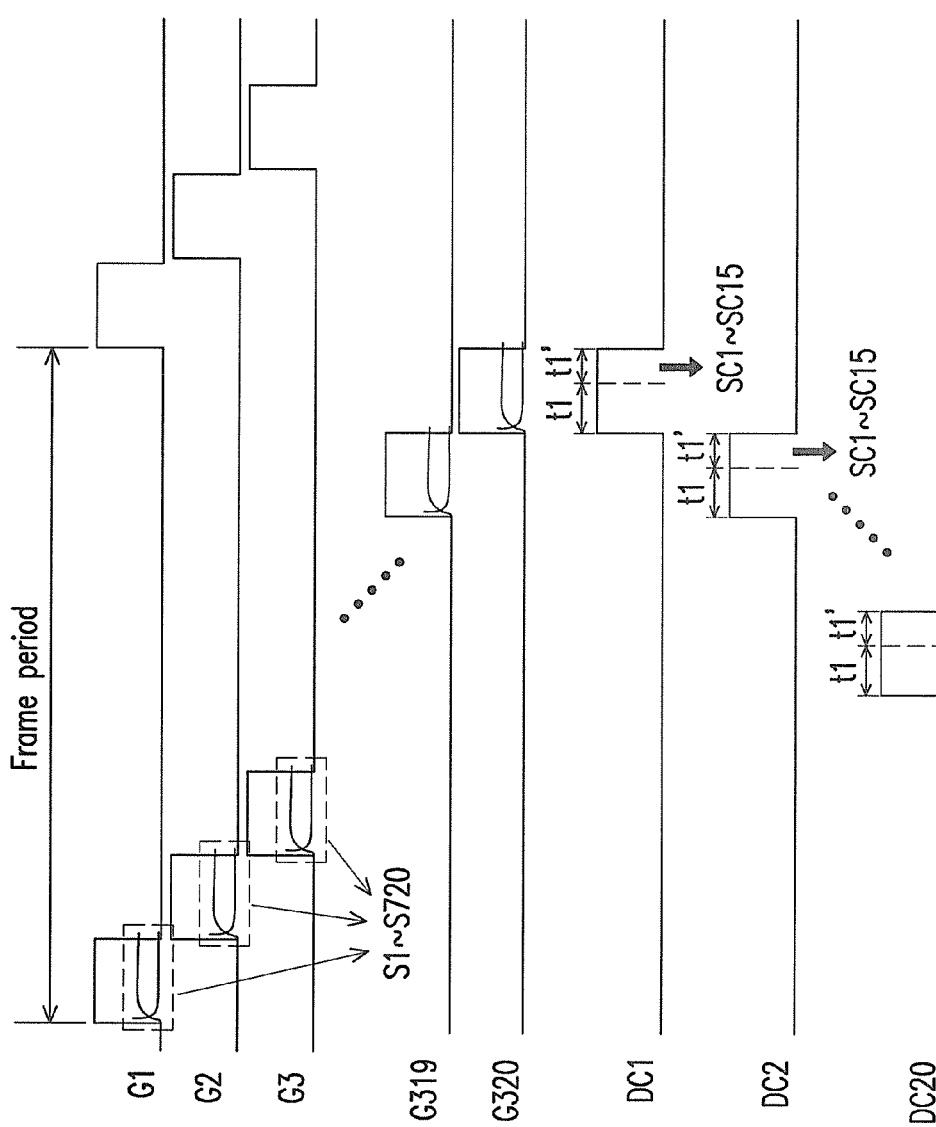
FIG. 2 is a signal timing diagram of the first embodiment of the invention.

In detail, FIG. 2 is a signal timing diagram of the first embodiment of the invention. Referring to FIG. 1 and FIG. 2, in the present embodiment, the driving unit 142 adjusts timings of the driving signals DC1-DC20, so as to synchronize the driving signal DC1 and the scan signal G320. For example, the driving unit 142 aligns a rising edge of the driving signal DC1 with a rising edge of the scan signal G320 for synchronization. When the driving signal DC1 and the scan signal G320 are synchronized, the other driving signals DC2-DC20 are respectively synchronized with the scan signals G319-G301. Namely, the driving signal DC1 is synchronized with the scan signal G320, the driving signal DC2 is synchronized with the scan signal G319, the driving signal DC3 is synchronized with the scan signal G318, . . . , the driving signal DC20 is synchronized with the scan signal G301. In other words, in the present embodiment, after one of the driving signals is synchronized with one of the scan signals, the other driving signals are respectively synchronized with the corresponding scan signals according to a driving sequence thereof.

Further, when the display panel 110 is driven, the first display scan line receives the scan signal G1, the second display scan line receives the scan signal G2, the third display scan line receives the scan signal G3, . . . , the $320^{th}$ display scan line receives the scan signal G320, and others are deduced by analogy. Meanwhile, the $20^{th}$ touch scan line of the touch panel 130 receives the driving signal DC1, the $19^{th}$ touch scan line receives the driving signal DC2, the $18^{th}$ touch scan line receives the driving signal DC3, . . . , the first touch scan line receives the driving signal DC20, and the others are deduced by analogy.

Therefore, by driving the touch display apparatus 100 according to the above method, the driving timing of the touch panel 130 is not overlapped to the scan timing of the display panel 110, so that the touch panel 130 is avoid being interfered by the display panel 110 when the touch panel 130 performs touch sensing. It should be noticed that in the present embodiment, the driving unit 142 of the touch controller 140 synchronizes the driving signal DC1 and the scan signal G320, though the invention is not limited thereto, and in other embodiments, the driving unit 142 can synchronize an $m^{th}$ driving signal in M driving signals with an $i^{th}$ scan signal in I scan signals, so as to avoid overlapping the driving timing of the touch panel 130 and the scan timing of the display panel 110, where $1 \leq i \leq I$ and $1 \leq m \leq M$. In the method that the driving unit 142 synchronizes the driving signal and the scan signal, m=1, i=I and M<I are taken as an example.

Besides the aforementioned method of synchronizing the driving signals and the scan signals is used to avoid the interference between the touch panel and the display panel, the driving unit 142 of the present embodiment further delays the sensing lines of the touch panel 130 by a predetermined time period t1 within each pulse width of the M driving signals for generating the sensing signals SC1-SC15, where the predetermined time period t1 is less than a pulse width of the scan signals, and is greater than a toggle time of the data signals.

For example, taking a frame period of 16.7 milliseconds (ms) as an example, the pulse width of each scan signal of the present embodiment is 52 microseconds (μs). Moreover, generally, the toggle time for writing the data signals S1-S720 to the data lines is about 10 μs. Therefore, the predetermined time period t1 is, for example, between 10 μs and 52 μs ($10 \mu s \leq t1 \leq 52 \mu s$), and in the present embodiment, the predetermined time period t1 is set to 20 μs.

Namely, after the touch scan lines of the touch panel 130 receive the corresponding driving signals DC1-DC20, the driving unit 142 of the touch controller 140 delays the sensing lines of the touch panel 130 by 20 μs for generating the sensing signals SC1-SC15, so as to perform the touch sensing within a sensing period t1'. In the present embodiment, the sensing period t1' that the touch panel 130 generates the sensing signals SC1-SC15 is, for example, between an endpoint of the predetermined time period t1 and a falling edge of the corresponding sensing signal, and a time length of the sensing period t1' is, for example, 32 μs. In this way, the touch panel 130 is not interfered by the writing operation of the data signals S1-S720 of the display panel 110.

Therefore, in the present embodiment, by synchronizing the driving signals and the scan signals, and delaying the sensing period of the touch panel, the touch panel can avoid the interference generated when the display panel is driven.

Second Embodiment

Figure 3:
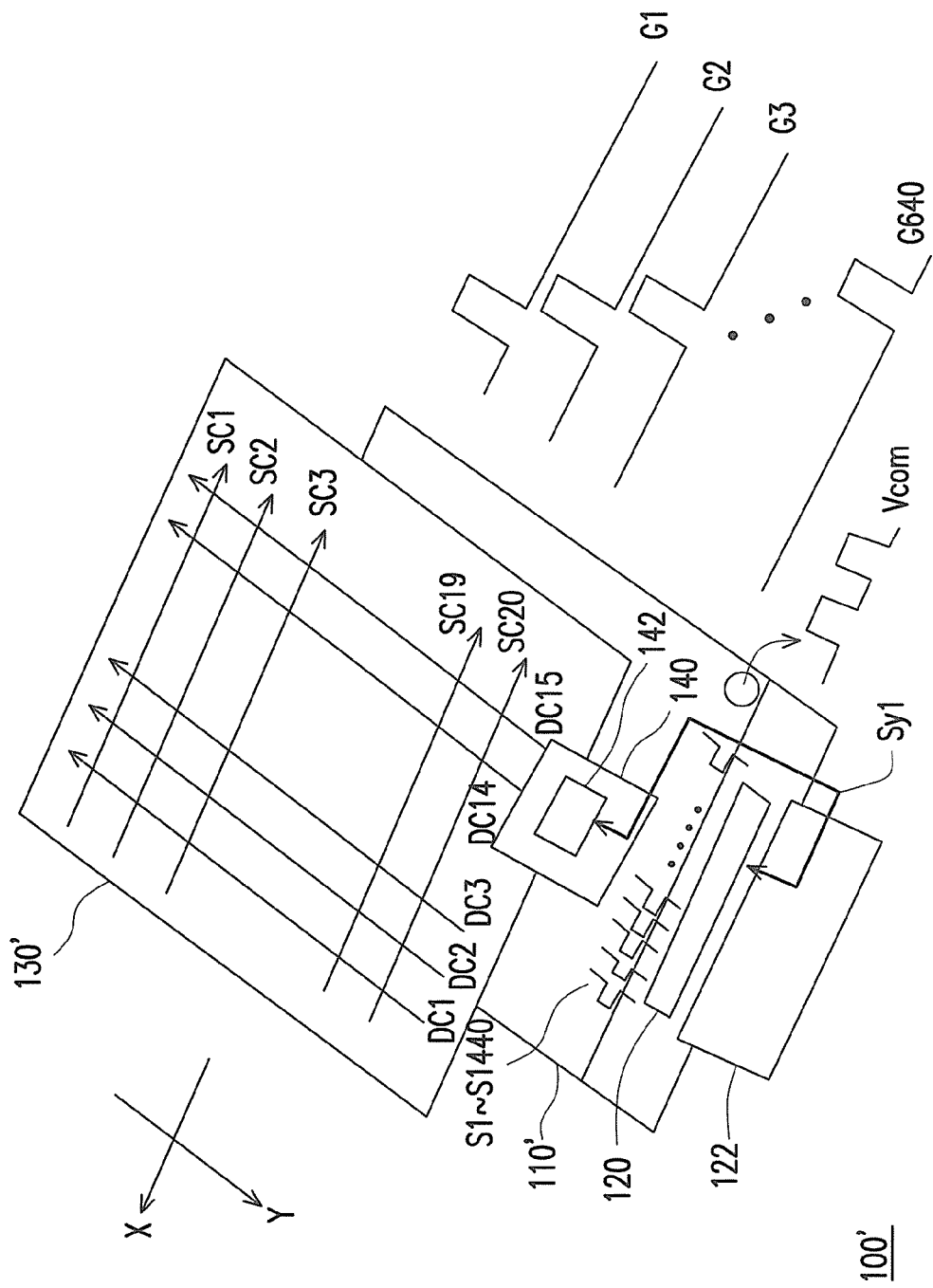
FIG. 3 is a schematic diagram of a touch display apparatus according to the second embodiment of the invention.

FIG. 3 is a schematic diagram of a touch display apparatus according to the second embodiment of the invention. Referring to FIG. 1A, FIG. 1B and FIG. 3, the touch display apparatus 100' of the present embodiment is similar to the touch display apparatus 100 of the first embodiment, and a main difference there between lies in arranging methods of display scan lines of a display panel 110' and touch scan lines of a touch panel 130' and a driving method of the touch display apparatus 100'. Moreover, the block schematic diagram of the touch display apparatus 100' is as that shown in FIG. 1B.

In detail, the display panel 110' includes a plurality of display scan lines and a plurality of data lines. When the display panel 110' is driven, the display scan lines sequentially receive corresponding scan signals G1-G640 for driving pixel units connected to the data lines to sequentially receive data signals S1-S1440. It should be noticed that for simplicity's sake, the display scan lines, the data lines and the pixel units are not illustrated on the display panel 110' of FIG. 3. However, according to the scan signals G1-G640 and the data signals S1-S1440 illustrated in FIG. 3, it is known that the display scan lines of the display panel 110' are, for example, arranged along the Y-direction, and the data lines are arranged along the X-direction.

The touch panel 130' includes a plurality of touch scan lines and a plurality of sensing lines. When the touch panel 130' is driven, the touch scan lines sequentially receive corresponding driving signals DC1-DC15 for driving sensing units connected to the sensing lines to sequentially generate corresponding sensing signals SC1-SC20 within a sensing period, so as to perform the touch sensing. It should be noticed that for simplicity's sake, the sensing units are not illustrated on the touch panel 130' of FIG. 3. Moreover, according to FIG. 3, it is known that the touch scan lines of the touch panel 130' are, for example, arranged along the X-direction, and the sensing lines are arranged along the Y-direction. In other words, in the present embodiment, the display scan lines of the display panel 110' and the touch scan lines of the touch panel 130' are respectively arranged along the Y-direction and the X-direction, which are substantially perpendicular to each other.

It should be noticed that in the present embodiment, the numbers of the display scan lines and the data lines of the display panel 110' and the numbers of the touch scan lines and the sensing lines of the touch panel 130' are only used as an example, and the invention is not limited thereto.

Figure 4:
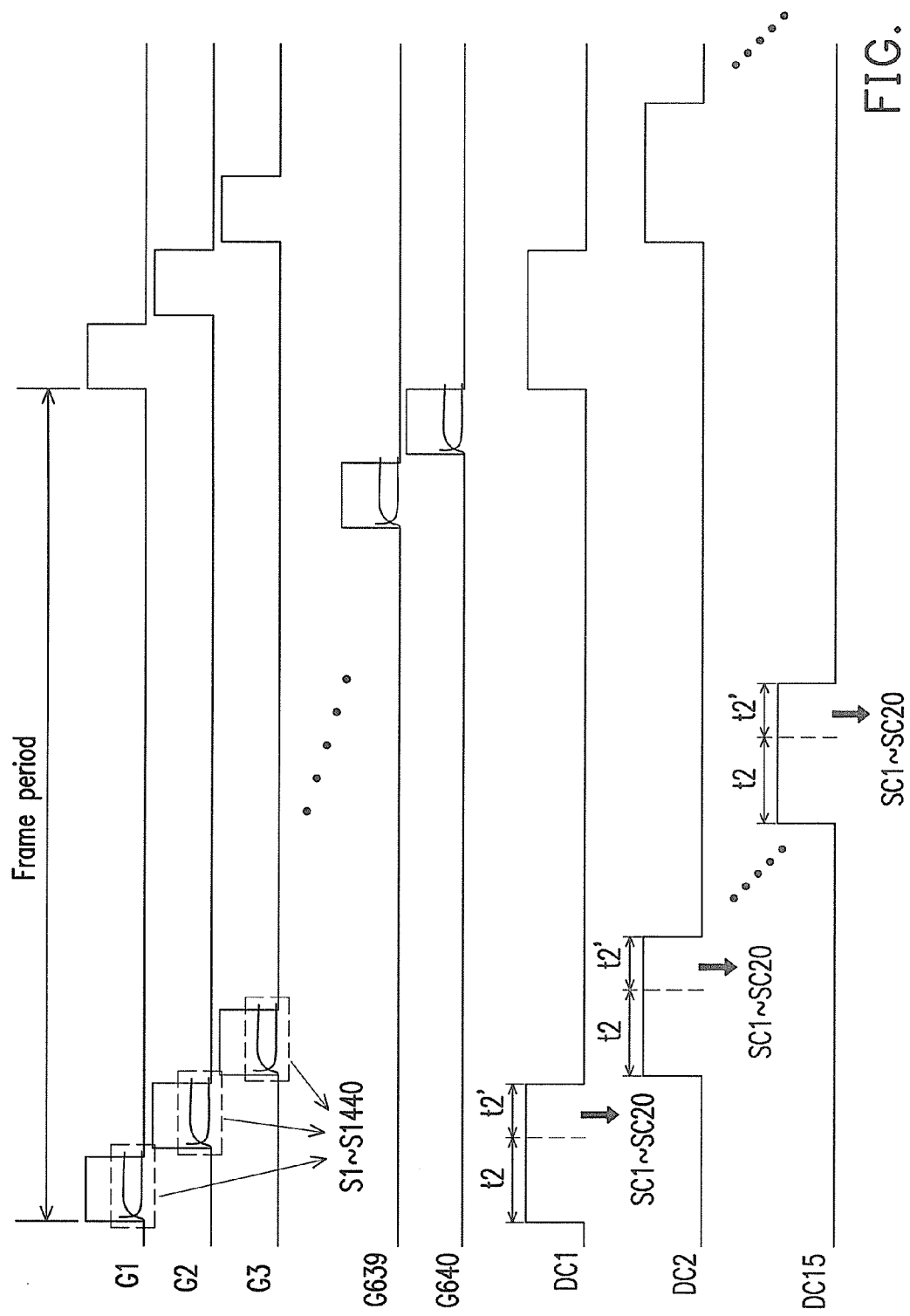
FIG. 4 is a signal timing diagram of the second embodiment of the invention.

FIG. 4 is a signal timing diagram of the second embodiment of the invention. Referring to FIG. 3 and FIG. 4, in the present embodiment, the driving unit 142 of the touch controller 140 adjusts timings of the driving signals DC1-DC15, so as to synchronize the driving signal DC1 and the scan signal G1. For example, the driving unit 142 aligns a rising edge of the driving signal DC1 with a rising edge of the scan signal G1 for synchronization. When the driving signal DC1 and the scan signal G1 are synchronized, the other driving signals DC2-DC15 are respectively synchronized with the corresponding scan signals. Namely, the driving signal DC1 is synchronized with the scan signal G1, the driving signal DC2 is synchronized with the scan signal G3, the driving signal DC3 is synchronized with the scan signal G5, . . . , the driving signal DC15 is synchronized with the scan signal G29. In other words, in the present embodiment, after one of the driving signals is synchronized with one of the scan signals, the other driving signals are respectively synchronized with the corresponding scan signals according to a driving sequence thereof.

For example, when the display panel 110' is driven, the first display scan line receives the scan signal G1, the second display scan line receives the scan signal G2, the third display scan line receives the scan signal G3, . . . , the $640^{th}$ display scan line receives the scan signal G640, and others are deduced by analogy. Meanwhile, the first touch scan line of the touch panel 130' receives the driving signal DC1, the second touch scan line receives the driving signal DC2, the third touch scan line receives the driving signal DC3, . . . , the $15^{th}$ touch scan line receives the driving signal DC15, and the others are deduced by analogy.

In the present embodiment, besides synchronizing the driving signals and the scan signals, the driving unit 142 of the touch controller 140 further increases a pulse width of each of the driving signals, so that the increased pulse width of the driving signal is greater than twice of a pulse width of the scan signal, as that shown in FIG. 4. Therefore, the driving unit 142 delays the sensing lines of the touch panel 130' by a predetermined time period t2 within each pulse width of the driving signals for generating the sensing signals SC1-SC20, where the predetermined time period t2 is greater than a sum of the pulse width of the scan signal and the toggle time of the data signals, and is less than the increased pulse width of the driving signal.

For example, taking a frame period of 16.7 ms as an example, the pulse width of each scan signal of the present embodiment is 26 μs. Moreover, generally, the toggle time for writing the data signals S1-S1440 to the data lines is about 10 μs. Therefore, the predetermined time period t2 is, for example, between 36 μs and 52 μs (36 μs≤t2≤52 μs), and in the present embodiment, the predetermined time period t2 is set to 36 μs.

Namely, after the touch scan lines of the touch panel 130' receives the corresponding driving signals DC1-DC15, the driving unit 142 delays the sensing lines of the touch panel 130' by 36 μs for generating the sensing signals SC1-SC20, so as to perform the touch sensing within a sensing period t2'. In the present embodiment, the sensing period t2' that the touch panel 130' generates the sensing signals SC1-SC20 is, for example, between an endpoint of the predetermined time period t2 and a falling edge of the corresponding sensing signal, and a time length of the sensing period t2' is, for example, 16 μs.

For example, after the touch scan line receives the driving signal DC1, the driving unit 142 delays the sensing lines of the touch panel 130' by 36 μs for generating the sensing signals SC1-SC20, and the sensing period t2' is between a rising edge and a falling edge of the scan signal DC2. Namely, the touch controller 140 synchronizes a rising edge of an $m^{th}$ driving signal and a rising edge of an $i^{th}$ scan signal, and delays the sensing lines by the predetermined time period t2 for generating the sensing signals SC1-SC20, and the sensing period t2' is between a rising edge and a falling edge of an $(i+1)^{th}$ scan signal, where M<I.

In this way, besides avoiding the interferences generated by the rising edges and the falling edges of the scan signals, the touch panel 130' can also avoid the interferences generated when the data signals S1-S1440 are written.

In the present embodiment, the driving unit 142 of the touch controller 140 synchronizes the driving signal DC1 and the scan signal G1, i.e. m=1, i=1 and M<I are taken as an example, though the invention is not limited thereto.

Therefore, in the present embodiment, by increasing the pulse width of the driving signal, and delaying the sensing period of the touch panel, the touch panel can avoid the interference generated when the display panel is driven.

Third Embodiment

Figure 5:
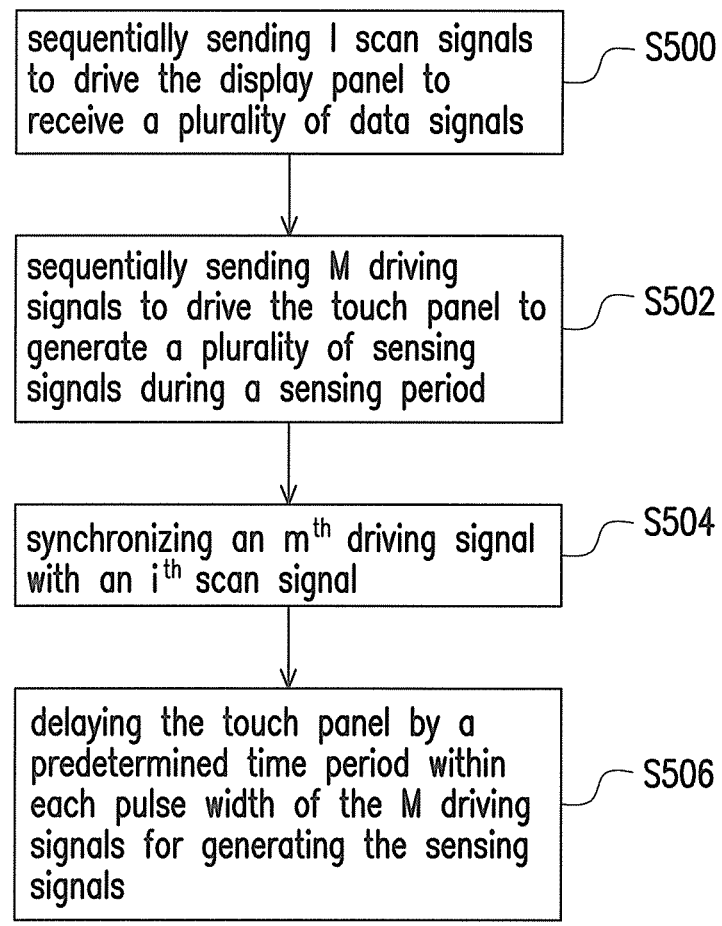
FIG. 5 is a flowchart illustrating a driving method of a touch display apparatus according to the third embodiment of the invention.

FIG. 5 is a flowchart illustrating a driving method of a touch display apparatus according to the third embodiment of the invention. Referring to FIG. 5, the driving method includes following steps.

In step S500, I scan signals are sequentially sent to drive the display panel to receive a plurality of data signals. In step S502, M driving signals are sequentially sent to drive the touch panel to generate a plurality of sensing signals during a sensing period. In step S504, an $m^{th}$ driving signal is synchronized with an $i^{th}$ scan signal, where 1≤i≤I and 1≤m≤M. In step S506, the touch panel is delayed by a predetermined time period within each pulse width of the M driving signals for generating the sensing signals.

Moreover, since those skilled in the art can learn enough instructions and recommendations of the driving method of the invention from the descriptions of the first embodiment and the second embodiment, detailed description thereof is not repeated.

In summary, in the exemplary embodiments of the invention, the driving signals are synchronized with the corresponding scan signals, and under control of the touch con-troller, the sensing period of the touch panel is not overlapped to the toggle time of the scan signals of the display panel and the toggle time of the data writing operation, so as to avoid the mutual interference between the touch panel and the display panel.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A driving method, adapted to a touch-sensing display apparatus, the touch-sensing display apparatus comprising a display panel and a touch panel, wherein the display panel comprises a plurality of display scan lines and a plurality of data lines, and the touch panel comprises a plurality of touch scan lines and a plurality of sensing lines, and the driving method comprising:

sequentially sending I scan signals to the display scan lines to drive the data lines of the display panel to receive a plurality of data signals;

sequentially sending M driving signals to the touch scan lines to drive the sensing lines of the touch panel to generate a plurality of sensing signals during a sensing period;

synchronizing an $m^{th}$ driving signal with an $i^{th}$ scan signal, wherein 1≤i≤I and 1≤m≤M; and the sensing period of the $m^{th}$ driving signal overlaps with the synchronizd $i^{th}$ scan signal; and delaying the touch panel by a predetermined time period within each pulse width of the M driving signals for generating the sensing signals, wherein the predetermined time period is less than a pulse width of the scan signals and is greater than a toggle time of the data signals, wherein in the step of synchronizing the $m^{th}$ driving signal with the $i^{th}$ scan signal, a rising edge of the $m^{th}$ driving signal is synchronized with a rising edge of the $i^{th}$ scan signal, wherein in the step of synchronizing the $m^{th}$ driving signal with the $i^{th}$ scan signal, m=1 and i=I.

2. A touch controller, adapted to a touch display apparatus, the touch display apparatus comprising a display panel, a display controller and a touch panel, wherein the display panel comprises a plurality of display scan lines and a plurality of data lines, and the touch panel comprises a plurality of touch scan lines and a plurality of sensing lines, the display controller sequentially sends I scan signals to the display scan lines to drive the data lines of the display panel to receive a plurality of data signals, and the touch controller comprising:

a driving unit coupled to the display panel and the touch panel, sequentially sending M driving signals to the touch scan lines to drive the sensing lines of the touch panel to generate a plurality of sensing signals during a sensing period, synchronizing an $m^{th}$ driving signal with an $i^{th}$ scan signal, and delaying the touch panel by a predetermined time period within each pulse width of the M driving signals for generating the sensing signals, wherein 1≤i≤I and 1≤m≤M, wherein the sensing period of the $m^{th}$ driving signal overlaps with the synchronizd $i^{th}$ scan signal, wherein the predetermined time period is less than a pulse width of the scan signals and is greater than a toggle time of the data signals, wherein the touch controller synchronizes a rising edge of the m$^{th}$ driving signal with a rising edge of the i$^{th}$ scan signal, wherein m=1, i=I and M<I.

3. The touch controller as claimed in claim 2, wherein the display scan lines and the touch scan lines are arranged along a first direction.

4. The touch controller as claimed in claim 2, wherein the display scan lines are arranged along a first direction, and the touch scan lines are arranged along a second direction.

5. The touch controller as claimed in claim 2, wherein the touch panel is a capacitive touch panel.

\* \* \* \* \*